Dec. 29, 1970     D. E. BERNOTUS     3,550,473

OVERLOAD PROTECTION DRIVING MECHANISM

Filed April 14, 1969     2 Sheets-Sheet 1

INVENTOR
DONALD E. BERNOTUS by: Wallenstein, Spangenberg,
Hattis & Strampel ATTYS.

Dec. 29, 1970     D. E. BERNOTUS     3,550,473
OVERLOAD PROTECTION DRIVING MECHANISM
Filed April 14, 1969     2 Sheets-Sheet 2
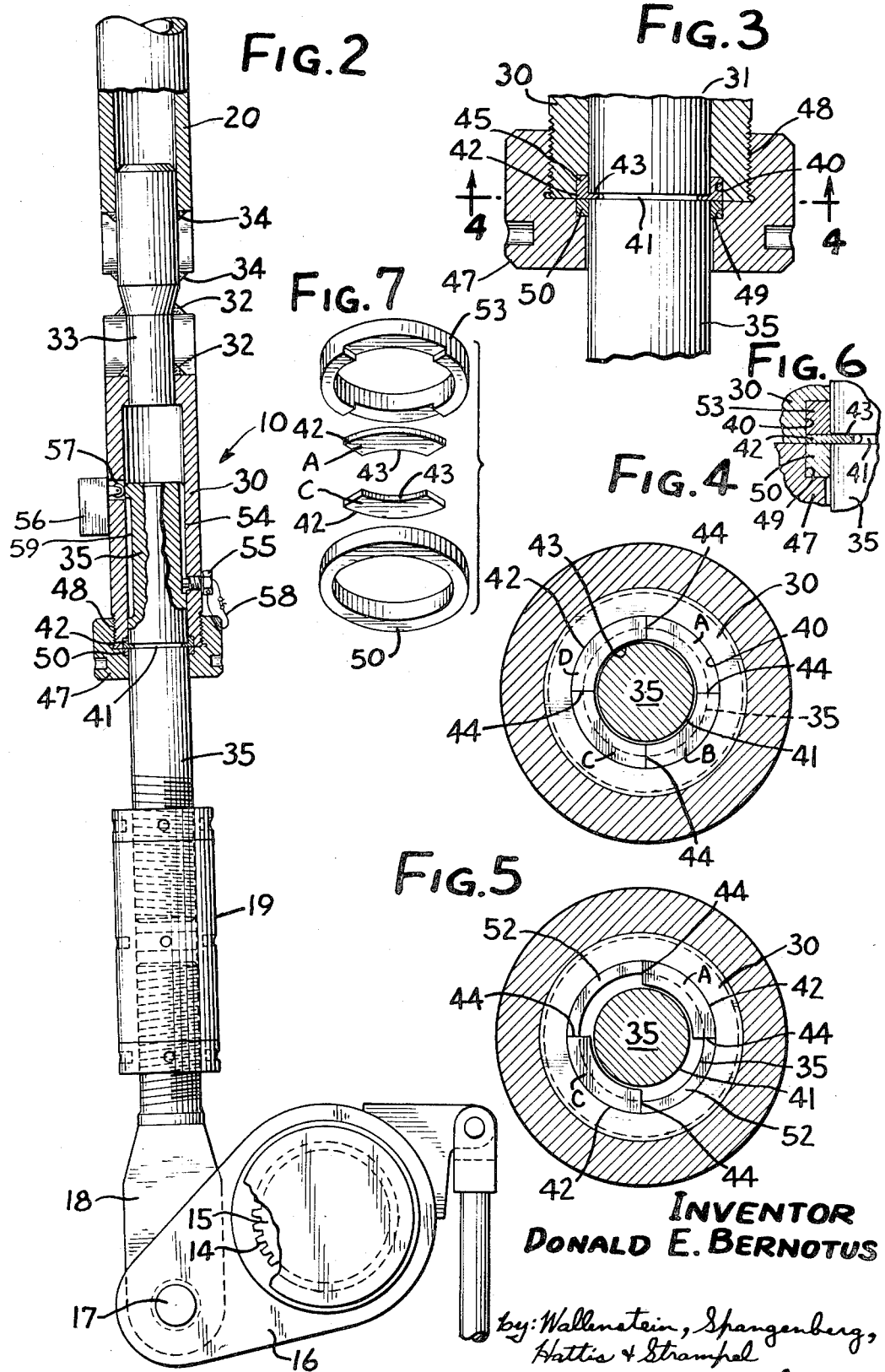
INVENTOR
DONALD E. BERNOTUS
by: Wallenstein, Spangenberg,
Hattis & Strampel
ATTYS.

United States Patent Office 3,550,473
Patented Dec. 29, 1970

3,550,473
OVERLOAD PROTECTION DRIVING MECHANISM
Donald E. Bernotus, Hammond, Ind., assignor to Verson Allsteel Press Company, Chicago, Ill., a corporation of Delaware
Filed Apr. 14, 1969, Ser. No. 815,779
Int. Cl. F16p 7/02
U.S. Cl. 74—584    18 Claims

ABSTRACT OF THE DISCLOSURE

An overload protection driving mechanism is connected between a driving member and a driven member for driving the latter from the former, includes a shearable driving connection which includes a hollow housing connected to one of the members and which has an internal annular recess in one end thereof, and a shaft connected to the other member which is slidably received in the hollow housing and which has an external annular recess normally adjacent the internal annular recess of the housing. A segmented annular shear plate has the inner portions thereof removably received in the annular external recess in the shaft and the outer portions removably received in the internal annular recess in the housing. A collar about the shaft is removably secured to the housing for clamping the outer portions of the segmented annular shear plate in the internal annular recess in the housing. The segmented annular shear plate forms a driving connection between the shaft and the housing which is shearable upon the occurrence of an excessive driving load.

---

The overload protection driving mechanism of this invention, while having general utility, has particular utility in a press for transmitting motion from the press drive to develop motion for auxiliary devices in the press, such transmission of motion being often accomplished by means of cams through connecting rods and links. It is desirable in many instances to provide overload protection to such mechanisms to prevent damage in the event of jam-up or malfunction that would increase the normal load quite substantially.

Heretofore, it has been common to use shear pins inserted at strategic locations in the connecting rods and links, but there is the disadvantage that when the shear pins shear, they often damage the holes in which the pins are fitted. This occurs even where the shear pins are slotted or necked down at the points of shear. The pieces of the shear pins after shearing are difficult to remove since the shearing action distorts the roundness of the pins at their sheared surfaces.

The principal object of this invention is to provide an improved overload protection driving mechanism between a driving member and a driven member which circumvents the above disadvantages which occur where shear pins are uitlized.

Briefly, in accordance with this invention, a hollow housing is connected to one of the members and it has an internal annular recess at one end. A shaft is connected to the other member, it is slidably received in the hollow housing and it has an external annular recess normally adjacent the internal annular recess in the end of the hollow housing. A segmented annular shear plate has the inner portions thereof removably received in the external annular recess in the shaft and the outer portions thereof removably received in the internal annular recess in the end of the hollow housing. This may be readily accomplished since the shear plate is segmented into at least two segments which may be separately inserted into the recesses. A collar is removably secured to the housing for clamping the outer portions of the segmented annular shear plate in the internal annular recess in the end of the housing, the clamped segmented annular shear plate forming the driving connection between the shaft and the housing which is shearable upon the occurrence of an excessive driving load.

The shearing of the segmented annular shear plate, when it occurs, occurs arcuately between the shaft and the housing, and the sheared segments may be readily removed from and replaced with new segments in the recesses in the shaft and housing merely by removing the clamping collar from the housing. To assure sharp arcuate shear edges, shear rings are preferably provided for the outer portions of the segmented annular shear plate, one of the shear rings being arranged in an annular recess in the collar and the other in the internal annular recess in the end of the housing. Either one or both of these shear rings may be made integral with the segmented annular shear plate, in which event they would also be segmented along with the segmented shear plate.

The segmented annular shear plate may have segments omitted therefrom and in this event the segments may be circumferentially spaced apart substantially equally, the spacing being maintained by spacer ring segments interposed between the outer portions of the shear plate segments or by a shear ring having slots for receiving the outer portions of the shear plate segments. By using circumferentially spaced apart shear plate segments, the use of unnecessarily thin shear surfaces that are difficult to heat treat to a uniform hardness is avoided. The force required to shear the segments of the segmented annular shear plate may be calculated for any given composition and hardness and may be tested if desired to predetermine load carrying capacity to ultimate shear. The load capacity is usually set above the maximum normal load transmitted. The segmented annular shear plate is equally sensitive to either tensile or compressive loads in the overload protection driving mechanism.

Other objects of this invention reside in the details of construction of the overload protection driving mechanism and in the cooperative relationships between the component parts thereof.

Further objects and advantages of this invention will become apparent to those skilled in the art upon reference to the accompanying specification, claims and drawings in which:

FIG. 2 is an enlarged view partly in section of the overload protection driving mechanism illustrated in FIG. 1;

FIG. 3 is a further enlarged vertical view through a portion of the overload protection driving mechanism of FIG. 2;

FIG. 4 is a horizontal sectional view through the overload protection driving mechanism taken substantially along the line 4—4 of FIG. 3;

FIG. 5 is a horizontal sectional view similar to that of FIG. 4 but illustrating the use of circumferentially spaced apart segments of the segmented annular shear plate;

FIG. 6 is a partial vertical sectional view similar to FIG. 3 but illustrating a variation thereof; and FIG. 7 is an exploded perspective view of the construction illustrated in FIG. 6.

Figure 1:
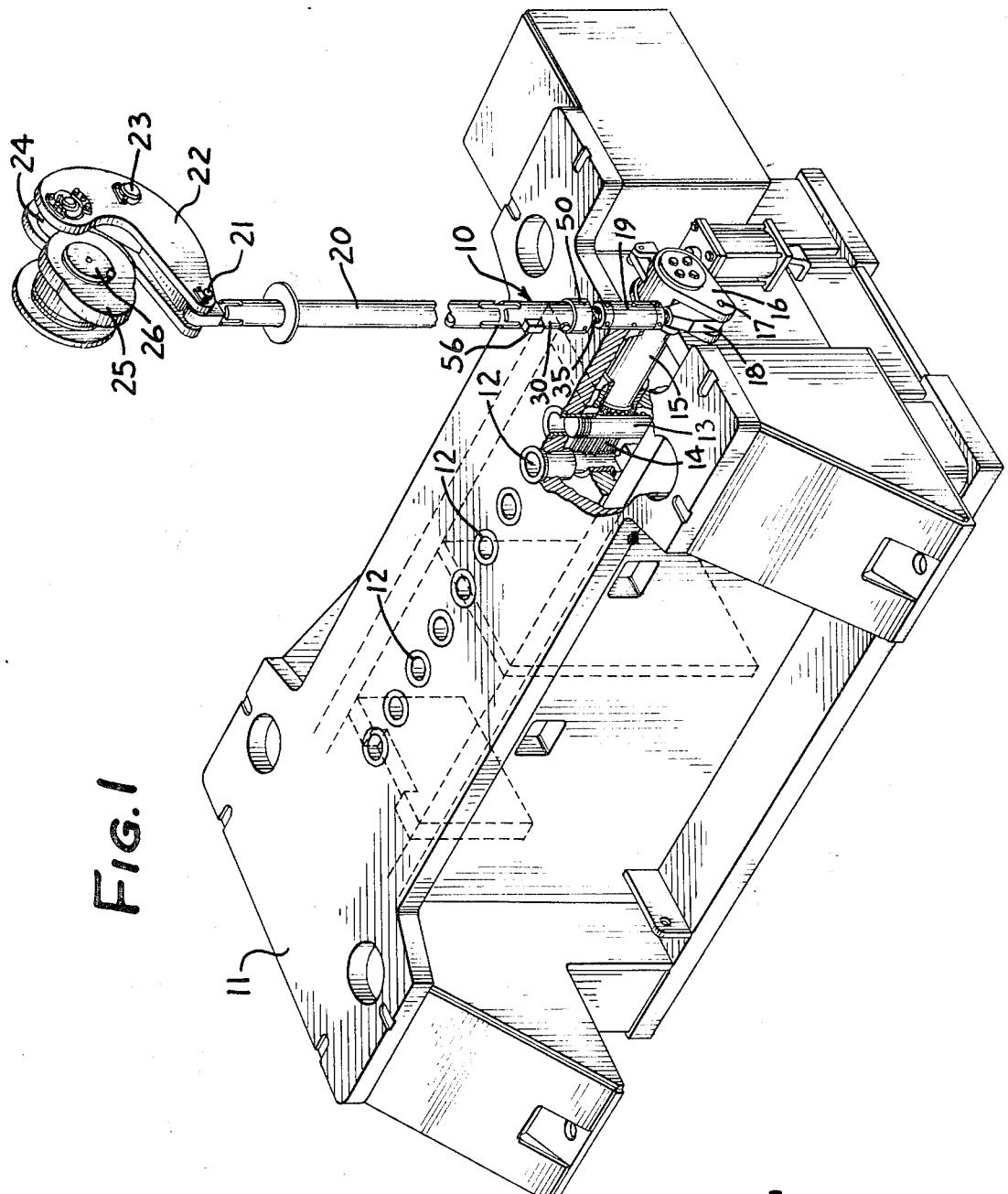
FIG. 1 is a partial perspective view of a press having the overload protection drive mechanism of this invention applied thereto.

The overload protection driving mechanism of this invention is generally designated at 10 in FIGS. 1 and 2 and it is illustrated in FIG. 1 as applied to a press or the like for transmitting motion from the press drive to develop motion for auxiliary devices in the press. Here, the press bed is indicated at 11 and it has auxiliary devices such as ejection devices 12. The ejection devices 12 include plungers 13 having rack teeth thereon which engage with a gear 14 on a shaft 15 so that as the shaft 15 is oscillated, the plungers 13 are raised and lowered for ejecting articles being formed by the press. The shaft 15 is oscillated by a crank 16 which is pivoted at 17 to a rod 18 which in turn is connected by a turnbuckle 19 to the overload protection driving mechanism 10. The overload protection driving mechanism 10 is in turn connected to a link 20 which in turn is pivoted at 21 to a lever 22 pivoted for oscillation about a pivot 23. A cam follower 24 on the lever 22 engages a cam 25 carried by a shaft 26 which in turn is connected to the press drive in the crown of the press, not shown. Thus, as the cam follower 24 is operated by the press drive, the lever 22 is oscillated and such motion is transmitted through the link 20, the overload protection driving mechanism and the rod 18 to the shaft 15 for raising and lowering the ejection plungers 13 in the bed of the press 11. If the motion of the ejector plungers 13 should be obstructed as by jamming or malfunction or the like, the overload protection driving mechanism 10 is sheared so as to prevent damage to the press. While the overload protection driving mechanism of this invention is illustrated as applied to a press where it has particular utility, it is also useful in other applications where overload protection is desired.

Referring now more particularly to FIGS. 2 to 7, the overload protection driving mechanism 10 includes a hollow housing 30 having a longitudinal bore 31 therein. The housing 30 is welded at 32 to a stub shaft 33 which in turn is welded as indicated at 34 to the link 20. Slidably mounted in the bore 31 in the housing 30 is a shaft 35 which is connected to the turnbuckle 19. The end of the hollow housing 30 is provided with an internal annular recess 40 which communicates with the bore 31 in the housing and the shaft 35 is provided with an external annular recess 41 which is normally adjacent the internal annular recess 40 in the housing.

A segmented annular shear plate 42 has its inner portion 43 received in the annular recess 41 in the shaft 35 and has its outer portion received in the internal annular recess 40 in the housing. The annular shear plate 42 is segmented as indicated at 44 into at least two segments, four of such segments A, B, C and D being illustrated in FIG. 4. Because of this segmentation of the annular shear plate the various segments may be readily inserted in the annular recess 41 in the shaft and the annular recess 40 in the housing. The segmented annular shear plate 42 may be flat as illustrated in FIGS. 6 and 7, or it may be provided with thickened integral arcuate ring segments 45 at the outer portion thereof which are received in the internal annular recess 40 in the housing 30 as illustrated in FIGS. 3 to 5.

A collar 47 which is arranged about the shaft 35 has internal screw threads 48 for engaging screw threads on the end of the housing 30 for the purpose of clamping the segmented annular shear plate 42 in the internal annular recess 40 in the end of the housing 30. Preferably the collar 47 also has an internal annular recess 49 for receiving a shear ring 50 which abuts against the segmented annular shear plate 42. The shear ring 50 and the thickened integral arcuate ring portions 45 on the segmented annular shear plate 42 in FIGS. 3 to 5 operate to provide sharp shearing edges for the segmented annular shear plate 42. Instead of providing the segmented annular shear plate 42 with the thickened arcuate portions 45, a shear ring 53 may be utilized in lieu of the thickened arcuate portions as shown in FIGS. 6 and 7. In both instances sharp arcuate shear edges are provided for the segmented annular shear plate 42.

The segmented annular shear plate 42 provides a driving connection between the housing 30 and the shaft 35 and upon the occurrence of an excessive driving load the segmented annular shear plate will shear along an arcuate path determined by the shear ring 50. Should the segmented annular shear plate shear, it may be readily removed by removing the collar 47 and removing the sheared segments from the recesses 40 in the housing 30 and 41 in the shaft 35. A new segmented annular shear plate may then be readily inserted and the collar 47 replaced upon the housing 30 so as to again form a driving connection between the housing 30 and the shaft 35.

Referring now to FIG. 5, it is noted that only the segments A and C of the segmented annular shear plate 42 are utilized, these segments A and C being circumferentially spaced apart substantially equally and being maintained in this spaced condition by spacer ring segments 52 arranged within the internal annular recess 40 in the housing 30. This arrangement of FIG. 5 is particularly useful where the shear load is such as would require an extremely thin cross-sectional area of the shear plate of FIG. 4. By using only some of the segments the cross-sectional area of the shear plate may be made thicker. The arrangement of FIG. 5 operates in the same manner as that of FIG. 4 and, accordingly, a further description thereof is not considered necessary.

In FIGS. 6 and 7 where segments A and C of the segmented shear plate 42 are used, they are flat and the outer portions thereof are received in notches in the shear ring 53, the notched portions of the shear ring 53 forming sharp shear edges for the shear plate segments and the other portions of the shear ring operating to maintain the spacing of the shear plate segments. The arrangement of FIGS. 6 and 7 operates in the same manner as those of FIGS. 4 and 5 and, accordingly, a further description thereof is not considered necessary.

The shaft 35 where it extends into the housing 30 is provided with a longitudinal groove 54 which receives a pin 55 carried by the housing 30 for preventing relative rotation between the housing 30 and the shaft 35. The pin 55 and the collar 47 may be provided with holes for receiving a wire 58 which may be sealed to establish that the segmented annular shear plate has not been replaced or tampered with. The housing 30 may carry a switch 56 which has a follower 57 engageable with the shaft 35 adjacent the upper end thereof. In the event that the segmented annular shear plate 42 should be sheared by an overload condition, the housing 30 will move with respect to the shaft 35 and upon such movement the actuator 57 will ride off the end of the shaft 35 or into a slot 59 in the shaft to actuate the switch 56 to provide an indication that the segmented annular shear plate 42 has been sheared. This indication may be used for stopping operation of the press should this be desired.

While for purposes of illustration one basic form of this invention has been disclosed, other forms thereof may become apparent to those skilled in the art upon reference to this disclosure and, therefore, this invention is to be limited only by the scope of the appended claims.

What is claimed is:

1. An overload protection driving mechanism connected between a driving member and a driven member for driving the latter from the former and including a shearable driving connection wherein said shearable driving connection comprises, a hollow housing connected to one of said members and having an internal annular recess in one end thereof, a shaft connected to the other of said members and slidably received in said hollow housing and having an external annular recess normally adjacent the internal annular recess in said housing, a segmented annular shear plate having the inner portions thereof removably received in the external annular recess in the shaft and having the outer potrions thereof removably received in the internal annular recess in the housing, and a collar about the shaft and removably secured to the housing for clamping the outer portions of the segmented annular shear plate in the internal annular recess in the housing, whereby said segmented annular shear plate forms a driving connection between the shaft and the housing which is shearable upon the occurrence of an excessive driving load.

2. An overload protection driving mechanism as defined in claim 1 wherein said collar has an internal annular recess facing the internal annular recess in the housing, and a shear ring in said internal annular recess in the collar at the outer portions of the segmented annular shear plate for providing sharp shear edges for the segmented annular shear plate.

3. An overload protection driving mechanism as defined in claim 1 further comprising a shear ring in said internal annular recess in the housing at the outer portions of the segmented annular shear plate for providing sharp shear edges for the segmented annular shear plate.

4. An overload protection driving mechanism as defined in claim 3 wherein said shear ring is segmented and integral with the outer portions of the segmented annular shear plate.

5. An overload protection driving mechanism as defined in claim 1 wherein said collar has an internal annular recess facing the internal annular recess in the housing, a shear ring in said internal annular recess in the collar at the outer portions of the segmented annular shear plate, and a shear ring is said internal annular recess in the housing at the outer portions of the segmented annular shear plate, said shear rings providing sharp shear edges for the segmented annular shear plate.

6. An overload protection driving mechanism as defined in claim 5 wherein at least one of said shear rings is segmented and integral with the outer portions of the segmented annular shear plate.

7. An overloaded protection driving mechanism as defined in claim 5 wherein said shear ring in said annular recess in the housing is segmented and integral with the outer portions of the segmented annular shear plate.

8. An overload protection driving device as defined in claim 1 wherein the outer portions of the segmented annular shear plate have integral arcuate ring segments of greater thickness than the inner portions of the segmented annular shear plate and which are received in the internal annular recess of the housing.

9. An overload protection driving device as defined in claim 8 wherein said collar has an internal annular recess facing the internal annular recess in the housing, and a shear ring in said internal annular recess in the collar at the outer portions of the segmented annular shear plate providing sharp shear edges for the segmented annular shear plate.

10. An overload protection driving mechanism as defined in claim 1 wherein the segments of the segmented annular shear plate are circumferentially spaced apart substantially equally, and arcuate spacer segments in the internal annular groove of the housing between the spaced apart segments of the segmented annular shear plate for maintaining such spacing.

11. An overload protection driving mechanism as defined in claim 8 wherein the segments of the segmented annular shear plate are circumferentially spaced apart substantially equally, and arcuate spacer segments of substantially the same thickness as the integral arcuate ring segments of the outer portions of the segmented annular shear plate arranged in the internal annular groove of the housing between the spaced apart segments of the segmented shear plate for maintaining such spacing.

12. An overload protection driving mechanism as defined in claim 10 wherein said collar has an internal annular recess facing the internal annular recess in the housing, and a shear ring in said internal annular recess in the collar at the outer portions of the segmented annular shear plate for providing sharp shear edges for the segmented annular shear plate.

13. An overload protection driving mechanism as defined in claim 11 wherein said collar has an internal annular recess facing the internal annular recess in the housing, and a shear ring in said internal annular recess in the collar at the outer portions of the segmented annular shear plate for providing sharp shear edges for the segmented annular shear plate.

14. An overload protection driving mechanism as defined in claim 1 wherein the segments of the segmented annular shear plate are circumferentially spaced apart substantially equally, and an annular shear ring in the internal annular groove of the housing having notches receiving the outer portions of the spaced apart segments of the segmented annular shear plate for maintaining such spacing thereof and for providing sharp shear edges therefor.

15. An overload protection driving mechanism as defined in claim 14 wherein said collar has an internal annular recess facing the internal annular recess in the housing, and a shear ring in said internal annular recess in the collar at the outer portions of the segmented annular shear plate for providing sharp edges for the segmented annular shear plate.

16. An overload protection driving mechanism as defined in claim 1 comprising a switch carried by the housing and having an actuator normally engaged by the shaft in the housing adjacent its end, whereby upon shearing of the segmented annular shear plate to allow movement of the shaft with respect to the housing, the switch is actuated.

17. An overload protection driving mechanism as defined in claim 16, wherein said shaft also has a groove near the end thereof for receiving the actuator, whereby the switch is actuated by movement in either direction of the shaft with respect to the housing.

18. An overload protection driving mechanism as defined in claim 1 comprising a longitudinal groove and pin connection between the shaft and housing to prevent relative rotation thereof.

References Cited

UNITED STATES PATENTS

| | | | |
|---|---|---|---|
| 1,788,071 | 1/1931 | Strout | 74—584UX |
| 2,812,843 | 11/1957 | Hummel | 74—581X |

FRED C. MATTERN, Jr., Primary Examiner

F. D. SHOEMAKER, Assistant Examiner

U.S. Cl. X.R.

192—150